June 30, 1953  H. KAISER  2,643,680
FLEXIBLE ELBOW
Filed Jan. 30, 1950

Henry Kaiser
INVENTOR.

BY *Clarence A. O'Brien*
*and Harvey B. Jackson*
Attorneys

Patented June 30, 1953

2,643,680

UNITED STATES PATENT OFFICE 2,643,680

FLEXIBLE ELBOW

Henry Kaiser, Kiel, Wis.

Application January 30, 1950, Serial No. 141,192

1 Claim. (Cl. 138—52)

This invention comprises novel and useful improvements in flexible conduits, and more particularly pertains to flexible spouts for grain, silage and the like.

Various objects of this invention are to provide a flexible conduit which can be readily adjusted in all directions so as to form a conduit of any desired configuration, and which is of simple construction, yet durable and highly efficient for the purposes intended.

An important feature of this invention resides in the provision for multiple telescoping sections which are flexibly joined by a plurality of pins which are secured to one end of each section and which pins are receivable in corresponding slots in the opposite end of the section superimposed above.

Another important feature of this invention resides in the provision for a reinforcing flange which surrounds each pin, and which flange is guidingly received in a depression which surrounds each slot.

These, together with various ancillary objects and features are attained by this device, a preferred embodiment of which has been illustrated by way of example only in the accompanying drawings wherein.

Figure 1:
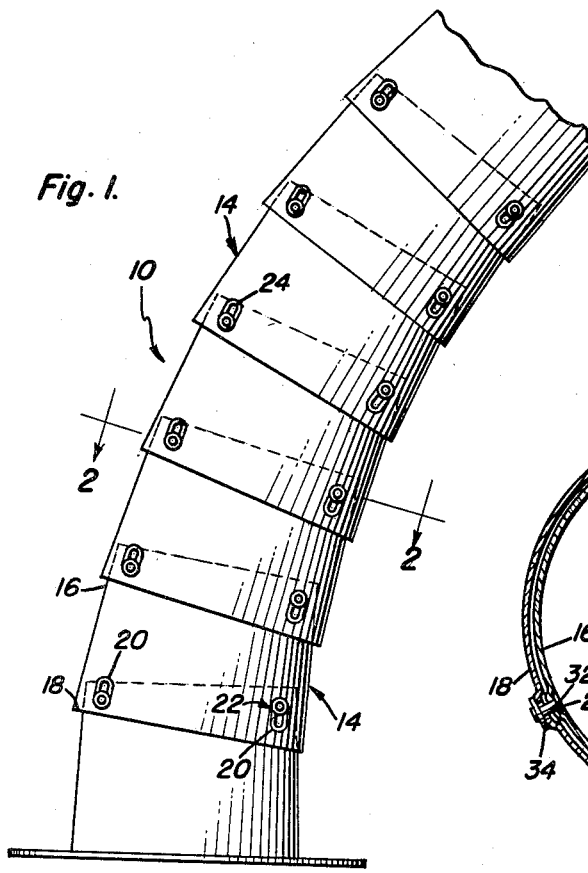
Figure 1 is a fragmentary elevational side view of the flexible conduit.
Figure 2:
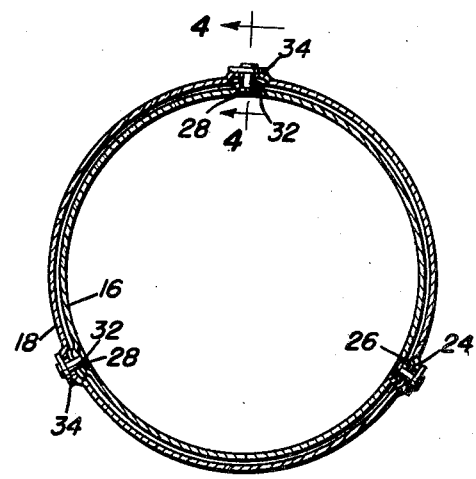
Figure 2 is a horizontal sectional view of the flexible conduit joint taken on a plane such as 2—2 of Figure 1.
Figure 3:
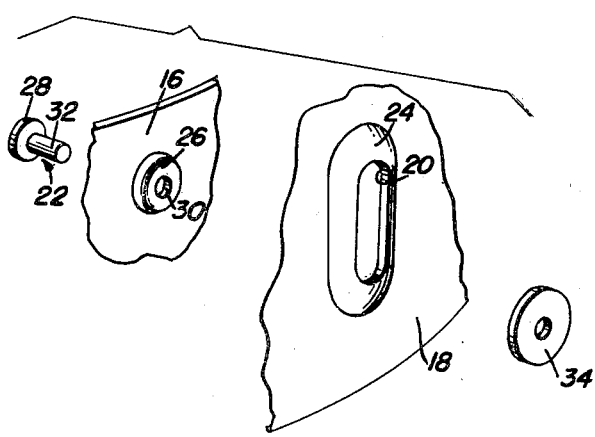
Figure 3 is a fragmentary exploded perspective detail view of one of the slidable connections which join the various sections.
Figure 4:
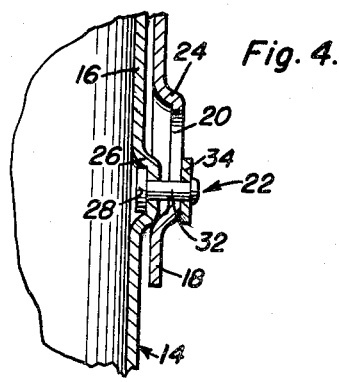
Figure 4 is a fragmentary vertical sectional view taken substantially on the plane 4—4 of Figure 2.

Referring now to the accompanying drawings wherein like numerals designate similar parts throughout the various views, it can be seen from a consideration of Figure 1 that there is provided a flexible conduit indicated generally by the numeral 10, which can advantageously be used to conduct grain or similar materials from one place to another, especially where the position of the second place relative to the first place varies from time to time so that it is necessary to intermittently vary the direction of the conduit.

The flexible conduit 10 may consist of conventional frusto-conical sections 14 having a smaller end 16 receivable in an enlarged end 18 of the section superimposed above. It is to be understood however that any series of telescoping sections may be used.

Each section 14 has provided, preferably adjacent the enlarged ends thereof, a plurality of slots 20, which slots extend longitudinally of each section. Radially disposed fasteners 22 are attached adjacent the smaller end of each section 14 and extend through the slots 20 and to thereby flexibly connect the telescoping sections 14.

In order to reinforce the sections 14 around the slots 20, flanges 24 may be provided. For reasons which will become apparent as the following description proceeds, it has been found advantageous to form the flanges 24 by flaring the section 14 about the slots 20. A similar annular flange 26 may also be provided for reinforcing the connection of the fastener 22 to the section 10.

The fasteners 22 may conveniently consist of pins 32, which pins are receivable in apertures 30 in the sections 14, the pins having heads or shoulders 28 on one end, and a washer or retainer 34 secured to their other end. Obviously by flaring the section around the apertures 30, the heads 28 may be recessed in the section, thereby permitting the grain or other material to pass unobstructed through the conduit 10. As an alternative construction, the heads 28 of the pins 32 could be welded or otherwise secured externally of the sections 14.

It is also believed apparent that the flange 26 may be so formed that when it is received in the depression formed by the flared portion of the section 14 which forms the flange 24, that it would guidingly space the telescoping portions of superimposed sections.

As is readily apparent from a consideration of the accompanying drawings, the provision for the radially disposed pins 32 on one of the sections 14, which pins are slidably received in the corresponding longitudinally extending slots 20 in the adjacent section, permits the conduit 10 to be flexed in any direction. It is preferable to use three or more uniformly spaced pins and slots to flexibly join adjacent sections so that even bending of the conduit in all directions will be achieved. However it is to be understood that a lesser number could be employed without departing from the spirit of this invention.

From the foregoing the construction and operation of the device will be readily apparent and further discussion is believed unnecessary. However, since numerous modifications will readily occur to those skilled in the art after a consideration of the foregoing specification and according to the drawings, it is not desired to limit the invention to that shown and described, but all suitable modifications may be resorted to falling within the scope of the appended claim.

Having described the invention, what is claimed as new is:

A flexible conduit comprising a plurality of telescoping frusto-conical sections, each of said sections having three axially extending slots adjacent one end arranged in equally spaced circumferential relation to one another, three circumferentially arranged equally spaced pins adjacent the other end of each section, said pins being received in the corresponding slots of an adjacent section to flexibly connect said sections for angular movement with respect to one another, said pins each having a head on the inner end thereof and a retainer on the outer end thereof, said sections having a concavo-convex guide flange surrounding each of said pins, the concave face of each of said guide flanges opening inwardly and receiving the head of one of said pins, an outwardly flared, axially extending rim on each of said sections around each slot providing a reinforcing flange, the convex face of each of said guide flanges being slidingly received within one of said rims.

HENRY KAISER.

References Cited in the file of this patent

UNITED STATES PATENTS

| Number | Name | Date |
|---|---|---|
| 251,585 | Hendershot | Dec. 27, 1881 |
| 259,457 | Armington | June 13, 1882 |
| 620,999 | Wambsgans | Mar. 14, 1899 |
| 1,630,588 | Sperry | May 31, 1927 |
| 1,636,005 | Leinbach | July 19, 1927 |
| 1,905,824 | Dysthe | Apr. 25, 1933 |

FOREIGN PATENTS

| Number | Country | Date |
|---|---|---|
| 857 | Netherlands | Oct. 1, 1915 |